United States Patent
Chang et al.

(10) Patent No.: US 10,274,934 B2
(45) Date of Patent: Apr. 30, 2019

(54) DATA GENERATING METHOD FOR 3D PRINTING, METHOD FOR PRINTING A 3D OBJECT, AND SYSTEM FOR PROCESSING 3D PRINTING DATA

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Yu-Chuan Chang, New Taipei (TW); Meng-Gung Li, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 801 days.

(21) Appl. No.: 14/537,453

(22) Filed: Nov. 10, 2014

(65) Prior Publication Data

US 2015/0242564 A1 Aug. 27, 2015

(30) Foreign Application Priority Data

Feb. 25, 2014 (TW) .............................. 103106285 A (51) Int. Cl.
*H04N 1/60* (2006.01)
*G05B 19/4099* (2006.01)

(52) U.S. Cl.
CPC ............... *G05B 19/4099* (2013.01); *G05B 2219/35016* (2013.01); *G05B 2219/49008* (2013.01); *G05B 2219/49023* (2013.01); *H04N 1/603* (2013.01)

(58) Field of Classification Search
CPC . A61C 13/0004; A61C 9/004; B29C 67/0059; B29C 67/0092; G05B 19/4099
See application file for complete search history.

(56) References Cited

U.S. PATENT DOCUMENTS 8,913,267 B2 * 12/2014 Fukano ................. G06F 21/608
358/1.1
2004/0184070 A1 9/2004 Kiraly et al.
(Continued)

FOREIGN PATENT DOCUMENTS

CN 1624649 A 6/2005
CN 102812463 A 12/2012
(Continued)

OTHER PUBLICATIONS

Search Report TW Patent Application No. 103106285 dated Oct. 22, 2015.
(Continued)

*Primary Examiner* — Charles E Anya
(74) *Attorney, Agent, or Firm* — Pillsbury Winthrop Shaw Pittman, LLP (57) ABSTRACT

A data generating method is implemented by a computing system for three-dimensional (3D) printing, and includes the steps of receiving a 3D graphic file and a printing profile containing printing parameters associated with 3D printing for the 3D graphic file; recording a correspondence between the 3D graphic file and the printing profile; and combining the 3D graphic file and the printing profile according to the recorded correspondence to generate a printing data file.

20 Claims, 10 Drawing Sheets

(56) References Cited

U.S. PATENT DOCUMENTS

| | | | | |
|---|---|---|---|---|
| 2012/0281013 A1* | 11/2012 | Mahdavi | ............... | G06F 17/50 |
| | | | | 345/619 |
| 2013/0235412 A1 | 9/2013 | Baldwin et al. | | |
| 2013/0329258 A1* | 12/2013 | Pettis | ............... | F16M 11/12 |
| | | | | 358/1.15 |
| 2014/0074272 A1* | 3/2014 | Cowden, IV | ........... | G06F 17/50 |
| | | | | 700/97 |
| 2015/0077215 A1* | 3/2015 | Ranky | ............... | B29C 70/88 |
| | | | | 338/47 |
| 2015/0220748 A1* | 8/2015 | Leach | ............... | G06F 21/608 |
| | | | | 726/26 |

FOREIGN PATENT DOCUMENTS

| | | |
|---|---|---|
| CN | 102968285 A | 3/2013 |
| CN | 103440382 A | 12/2013 |
| CN | 103495731 A | 1/2014 |

OTHER PUBLICATIONS

Search Report Chinese Patent Application No. 2014102574918 dated May 27, 2017.
Search Report appended to an Office Action, which was issued to Chinese counterpart application No. 2014102574918 by the SIPO dated Feb. 26, 2018, with an English translation thereof.

* cited by examiner

DATA GENERATING METHOD FOR 3D PRINTING, METHOD FOR PRINTING A 3D OBJECT, AND SYSTEM FOR PROCESSING 3D PRINTING DATA

CROSS-REFERENCE TO RELATED APPLICATION

This application claims priority to Taiwanese Application No. 103106285, filed on Feb. 25, 2014.

BACKGROUND OF THE INVENTION

1. Field of the Invention

The invention relates to a data processing method, and more particularly to a data generating method for three-dimensional (3D) printing, a method for printing a 3D object, and a data processing system for processing 3D printing data.

2. Description of the Related Art

When conducting 3D printing, in order to obtain a 3D object with good quality, a plurality of printing parameters may require adjustment according to properties of a to-be-printed 3D graphic file. As an example, for certain shapes including an overhanging portion that does not directly contact any object on a substrate, a support material may be required to aid in 3D printing. As another example, although the 3D graphic file illustrates a surface shape, a shell thickness or a layer density must be defined for printing a 3D object.

In addition, slicing operation is required prior to 3D printing. "Slicing" is to divide a 3D model of the 3D graphic file into multiple horizontal thin layers with a printable thickness, and to compute a printing path. Then, a G-code (i.e., a 3D printing programming language code) file is generated to enable a 3D printer to perform 3D printing. In 3D printing, since positions among each of the layers should be highly correlated, and a printer nozzle may be required to continuously eject printing materials in some cases, a movement path of the printer nozzle must be first simulated. 3D printing may be performed after successful slicing and generation of a G-code file. Otherwise, correction of the printing parameters must be repeatedly performed. In some cases, the printing parameters may need to be set layer by layer.

As a result, it is difficult for an ordinary person without professional knowledge to perform 3D printing. A creator of the 3D graphic file may even lack related knowledge to set appropriate printing parameters. Therefore, how to obtain a well-defined 3D printing data file so that an ordinary person may print a 3D object is the subject of this application.

SUMMARY OF THE INVENTION

Therefore, an object of the present invention is to provide a data generating method for three-dimensional (3D) printing that may facilitate obtaining a well-defined printing data file for printing a 3D object.

According to one aspect of the present invention, a data generating method is provided for three-dimensional (3D) printing. The data generating method is to be implemented by a computing system, and comprises the steps of:

(A) receiving, by the computing system, a 3D graphic file and a printing profile that is associated with 3D printing for the 3D graphic file;

(B) recording, by the computing system, a correspondence between the 3D graphic file and the printing profile that are received in step (A); and (C) combining, by the computing system, the 3D graphic file and the printing profile according to the correspondence recorded in step (B) to generate a printing data file.

Another object of the present invention is to provide a method that simplifies printing of a three-dimensional (3D) object.

According to another aspect of the present invention, a method is provided for printing a three-dimensional (3D) object. The method is to be implemented by an electronic device coupled to a 3D printing device, and comprises:

(A) loading, by the electronic device, a printing data file that contains a 3D graphic file portion and a printing profile portion that is associated with 3D printing for the 3D graphic file portion;

(B) slicing, by the electronic device, the 3D graphic file portion according to the printing profile portion to generate a slicing result, and generating a control command according to the slicing result; and (C) driving, by the electronic device, the 3D printing device according to the control command to form the 3D object.

Yet another object of the present invention is to provide a data processing system capable of simplifying three-dimensional (3D) printing.

According to yet another aspect of the present invention, a data processing system is provided for processing three-dimensional (3D) printing data, and comprises:

a storage unit configured to store a 3D graphic file and a printing profile that is associated with 3D printing for the 3D graphic file, and to record a correspondence between the 3D graphic file and the printing profile; and a processor configured to combine the 3D graphic file and the printing profile according to the correspondence stored in the storage unit to generate a printing data file.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
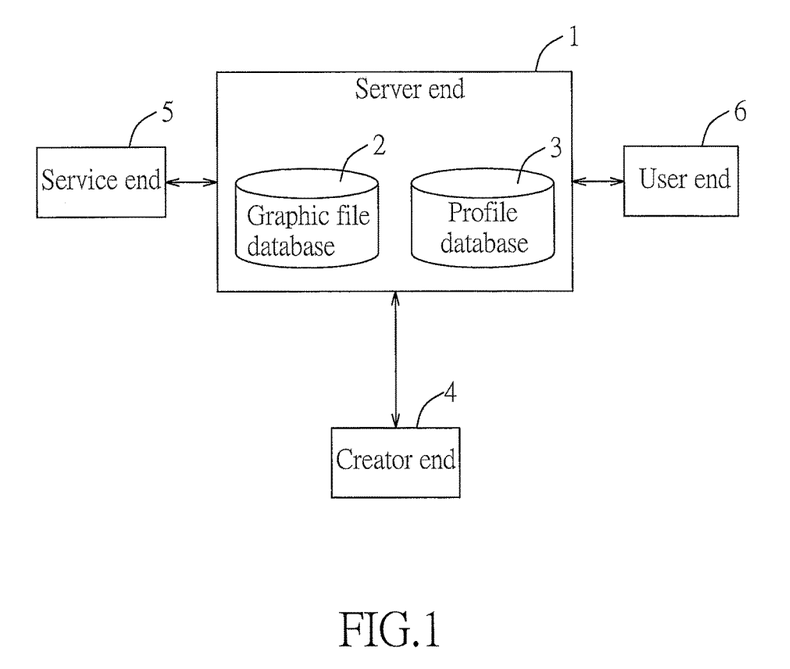
FIG. 1 is a schematic diagram illustrating relationships among a server end, a creator end, a service end and a user end in a first preferred embodiment of the data generating method for 3D printing and the method for printing a 3D object according to the present invention.

Referring to FIG. 1, the first preferred embodiment of the data generating method for three-dimensional (3D) printing and the method for printing a 3D object according to the present invention are implemented using a 3D printing data processing system that includes a server end 1, a graphic file database 2 and a profile database 3 that are, accessible to the server end 1, and a creator end 4, a service end 5 and a user end 6 that are coupled to the server end 1. In this embodiment, the server end 1 is a server including the graphic file database 2 and the profile database 3. It should be noted that the server end 1, the creator end 4, the service end 5 and the user end 6 are not limited to be different ends. For example, the user end 6 and the creator end 4 may be the same end, the server end 1 and the service end 5 may be the same end, or the server end 1, the creator end 4 and the service end 5 may be the same end, and the present invention should not be limited in this respect. Each of the server end 1, the creator end 4, the service end 5 and the user end 6 may include at least one electronic device to implement the various embodiments of this invention.

The graphic file database 2 is configured to store 3D graphic files, such as STL (stereolithography) files (i.e., files with a filename extension of .stl). The profile database 3 is configured to store printing profiles, each of which may include a plurality of printing parameters associated with attributes for 3D printing.

The 3D graphic files and the printing profiles have correspondences therebetween. In one case, one 3D graphic file has a correspondence with one printing profile, where the printing profile contains a plurality of printing parameters that are optimal to sliced layers of the 3D graphic file. In this embodiment, the correspondence between the 3D graphic file and the printing profile is recorded in, but not limited to, the graphic file database 2. The recorded correspondence may be identification information of the printing profile that corresponds to the 3D graphic file, and the printing profile may be accessed according to the identification information. The identification information may be a filename, a storage path of the printing profile or an identification code (e.g., a serial number) of the printing profile in the profile database 3.

In another case, one 3D graphic file has correspondences with multiple printing profiles. As an example, the 3D graphic file has correspondences with the printing profiles that are configured respectively for high, medium and low printing qualities.

The 3D graphic files may be obtained from the creator end 4. The printing profiles and the correspondences with the 3D graphic files may be obtained from the service end 5. The service end 5 may be operated by a professional operator, or use certain algorithms, such as an artificial neural network, massive computing, etc., to generate the printing profiles.

Figure 2:
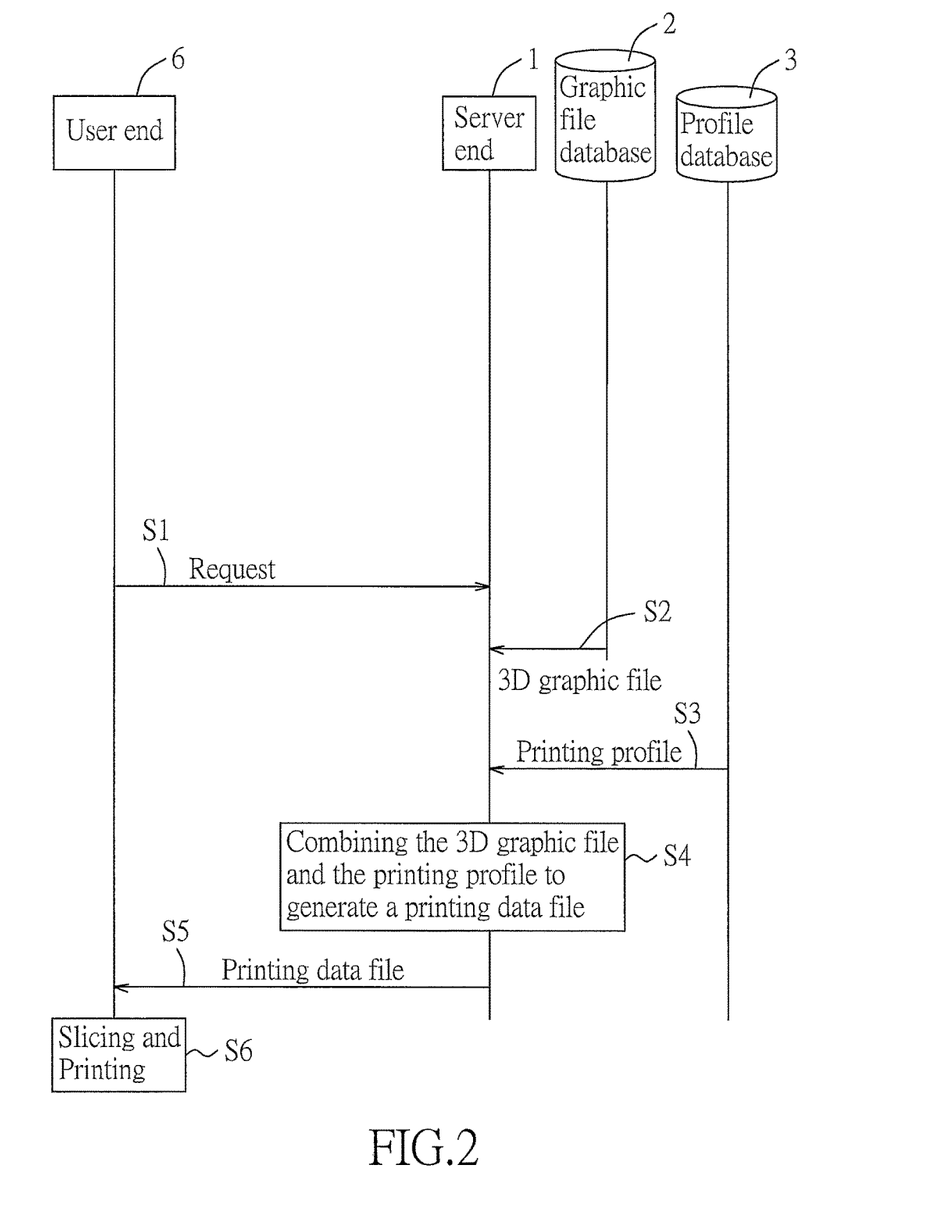
FIG. 2 is a flow diagram illustrating steps S1 to S6 of the data generating method for 3D printing of the first preferred embodiment.

Referring to FIG. 2, steps of the data generating method for 3D printing are described hereinafter.

Step S1: The server end 1 receives a user command from the user end 6. The user command includes a request for acquiring a printing data file associated with a 3D graphic file. In application, the server end 1 may display a 3D model of the 3D graphic file on a webpage. When the user end 6 wishes to print the 3D model of the 3D graphic file, a corresponding hyperlink may be clicked to enable the server end 1 to proceed with the next step.

When the 3D graphic file has the correspondence with only one printing profile, the flow directly goes to the next step. When the 3D graphic file has the correspondences with multiple printing profiles, for example, configured respectively for high, medium and low printing qualities, the server end 1 further provides options for selecting high, medium or low printing qualities. After the server end 1 receives the selected option from the user end 6, the server end 1 uses the printing profile that corresponds to the selected option for proceeding with the next step. As an example, the server end 1 displays multiple hyperlinks that correspond to different printing qualities, and a desired hyperlink is clicked at the user end 6 to enable the server end 1 to proceed with the next step.

Step S2: The server end 1 reads the 3D graphic file selected at the user end 6 according to the request included in the user command.

Step S3: The server end 1 reads the printing profile corresponding to the selected 3D graphic file according to the correspondence therebetween.

Step S4: The server end 1 combines the selected 3D graphic file and the corresponding printing profile to generate the printing data file.

In this embodiment, the server end 1 combines the printing profile using a source code of the 3D graphic file to generate the printing data file as the following program code (1).

| Program Code (1) |
| --- |
| [PROFILE]<br>[raft]VAL[/raft]           ; VAL = {0,1}, 0:No, 1:Yes<br>[support]VAL[/support]     ; VAL = {0,1}, 0:No, 1:Yes<br>[density]VAL[/density]     ; VAL = {0,1,2,3,4}, 0: Hollow, 1:Low,<br>                             2:Medium, 3: High, 4: Solid<br>[resolution]VAL[/resolution] ; VAL = {0,1,2,3}, 0: 0.1, 1: 0.2, 2: 0.3, 3: 0.4<br>[shells]VAL[/shells]       ; VAL = {0,1,2}, 0: Thin, 1: Normal, 2: Thick<br>[speed]VAL[/speed]         ; VAL = {0,1,2}, 0: Slow, 1: Standard, 2: Fast<br>[/PROFILE]<br>[STL]<br><triangle> ... </triangle><br>...<br><triangle> ... </triangle><br>[/STL] |

In the program code (1), content between [PROFILE] and [/PROFILE] is content of the printing profile, and content between [STL] and [/STL] is content of the 3D graphic file. In this embodiment, the file of the program code (1) has a filename extension of .nkg.

Step S5: The server end 1 transmits the printing data file to the user end 6 according to the request of the user command.

Figure 3:
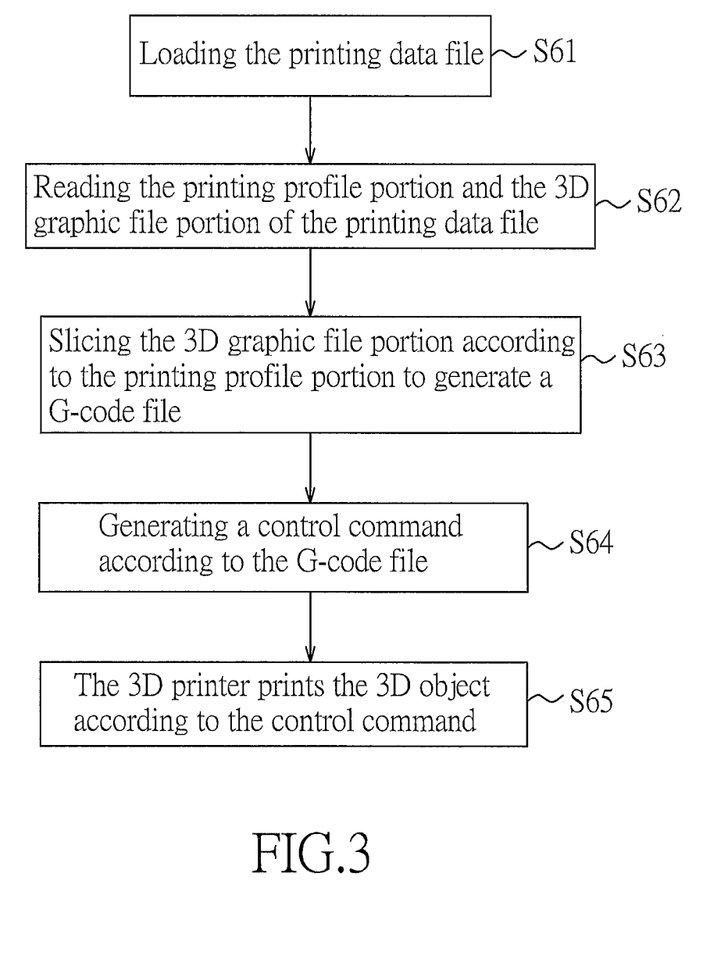
FIG. 3 is a flow chart illustrating steps of the method for printing a 3D object of the first preferred embodiment.

Step S6: The user end 6 performs slicing operation on the 3D graphic file portion and printing, that is, performs the method for printing a 3D object according to the present invention, which uses a computer terminal to generate a control command for driving a 3D printing device to form a 3D object (not shown). In this embodiment, the user end 6 includes the computer terminal, and the 3D printing device is a 3D printer 66 (see FIG. 8) coupled to the user end 6. Referring to FIG. 3, steps of the method for printing a 3D object according to the present invention are described hereinafter.

Step S61: The user end 6 loads a printing data file that contains a 3D graphic file portion and a printing profile portion. The printing profile portion contains printing parameters associated with 3D printing for the 3D graphic file portion.

Step S62: The user end 6 reads the 3D graphic file portion and the printing profile portion of the printing data file, and the flow goes to step S63.

Step S63: The user end 6 slices the 3D graphic file portion according to the printing profile portion to generate a slicing result, i.e., a G-code file, and the flow goes to step S64.

It should be noted that, in step S63, the user end 6 may directly slice the 3D graphic file portion according to the printing profile portion since the printing profile portion that is included in the printing data file has been optimized, and it is not necessary for the user end 6 to set parameters anew. Moreover, since the 3D graphic file and the printing profile are combined in a single file, i.e., the printing data file, mismatch between the 3D graphic file and the printing profile would not occur during operation of the user end 6.

Step S64: The user end 6 generates a control command according to the slicing result (i.e., the G-code file), and provides the control command to the 3D printer 66. The control command is configured to drive the 3D printer 66 to form the 3D object. Then, the flow goes to Step S65.

Step S65: The 3D printer 66 prints the 3D object according to the control command provided by the user end 6 in Step S64.

Figure 4:
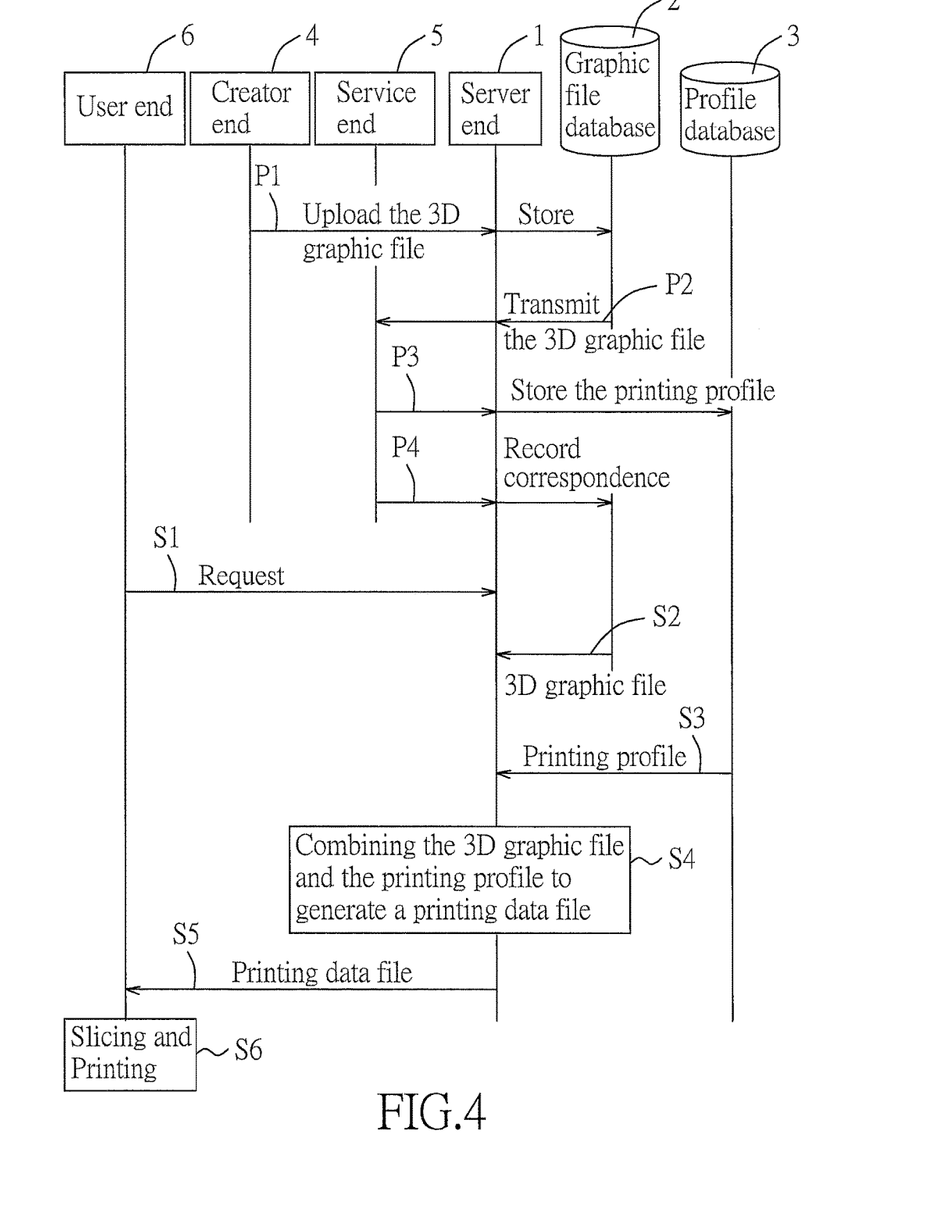
FIG. 4 is a flow diagram illustrating steps P1 to P4 and S1 to S6 of the data generating method for 3D printing of the first preferred embodiment.

Referring to FIG. 4, recording of the correspondences among the 3D graphic files and the printing profiles may be implemented using the server end 1, the creator end 4 and the service end 5, and includes Steps P1 to P4 which occur prior to Step S1, and which are described hereinafter.

Figure 5:
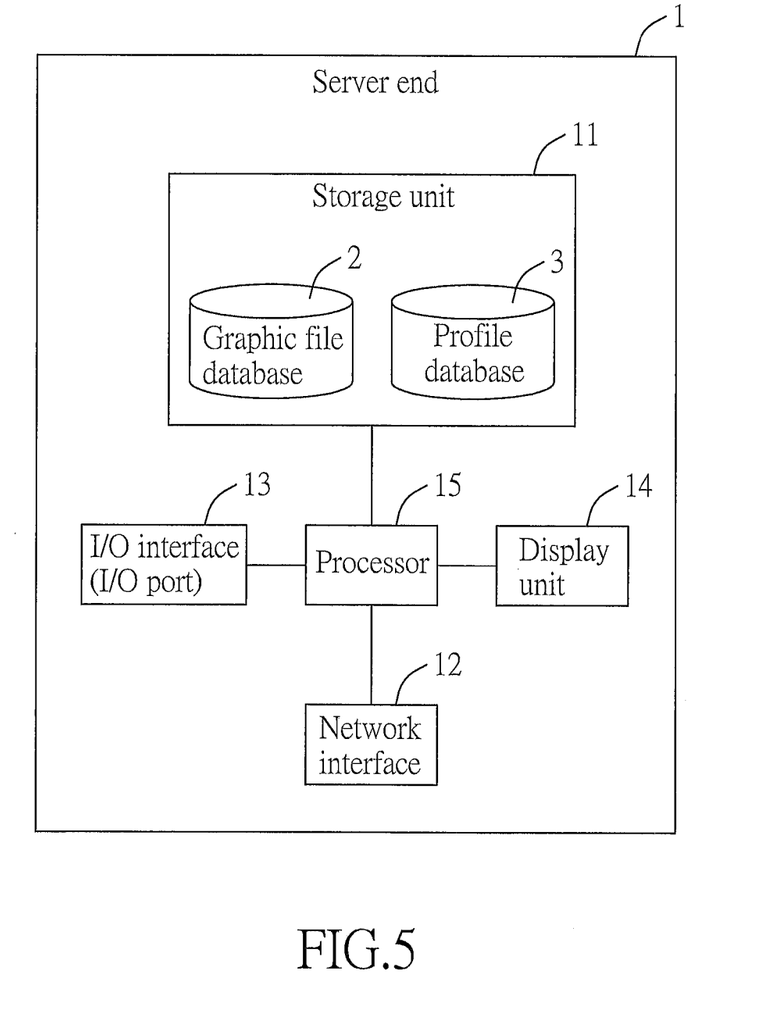
FIGS. 5 to 8 are block diagrams of the server end, the creator end, the service end and the user end of the first preferred embodiment, respectively.

Referring to FIG. 5, the server end 1 is a computing system (not shown) including only one server in this embodiment. In other embodiments, the server end 1 may be a computing system that includes multiple servers (e.g., a cloud server system). In this embodiment, the server end 1 includes a storage unit 11, a network interface 12 coupled to the Internet, an input/output (I/O) interface 13, a display unit 14 and a processor 15 coupled to the aforementioned components 11, 12, 13 and 14. The I/O interface 13 may include input devices, such as a keyboard, a mouse, and/or a touch screen, and a data transmission interface, such as a USB port and/or other standard I/O port. The storage unit 11 stores program codes that configure the processor 15 to implement the methods of the present invention when executed, as well as the graphic file database 2 and the profile database 3.

In other embodiments, multiple servers, which may include a cloud server system, may be used to serve as the server end 1. Storage spaces of the servers are integrally called the storage unit 11. Each of the programming codes, the correspondences between the 3D graphic files and the printing profiles, the graphic file database 2 and the profile database 3 may be stored in any one of the servers.

Figure 6:
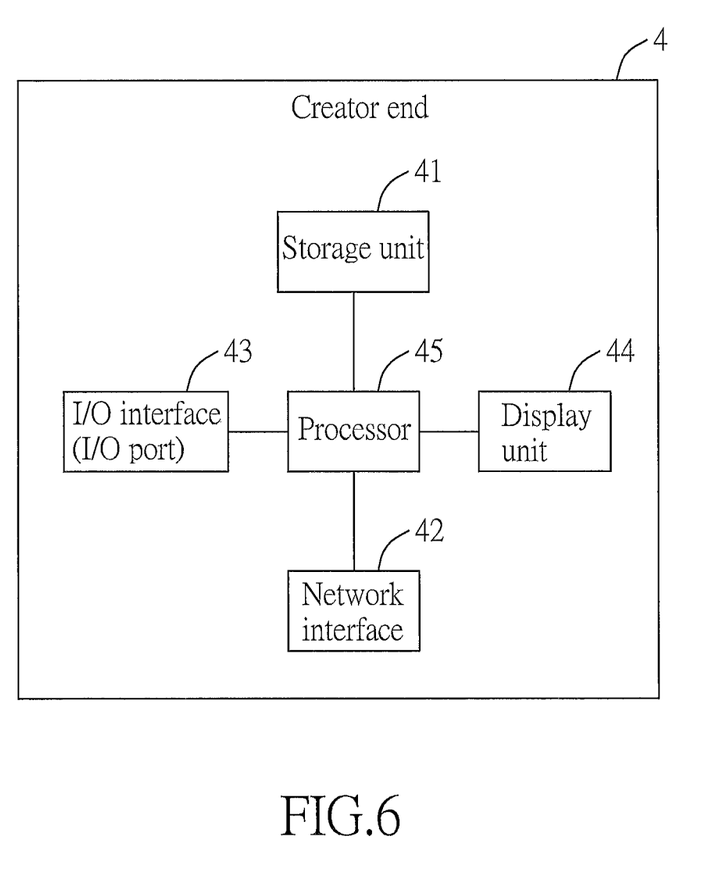
Figure 7:
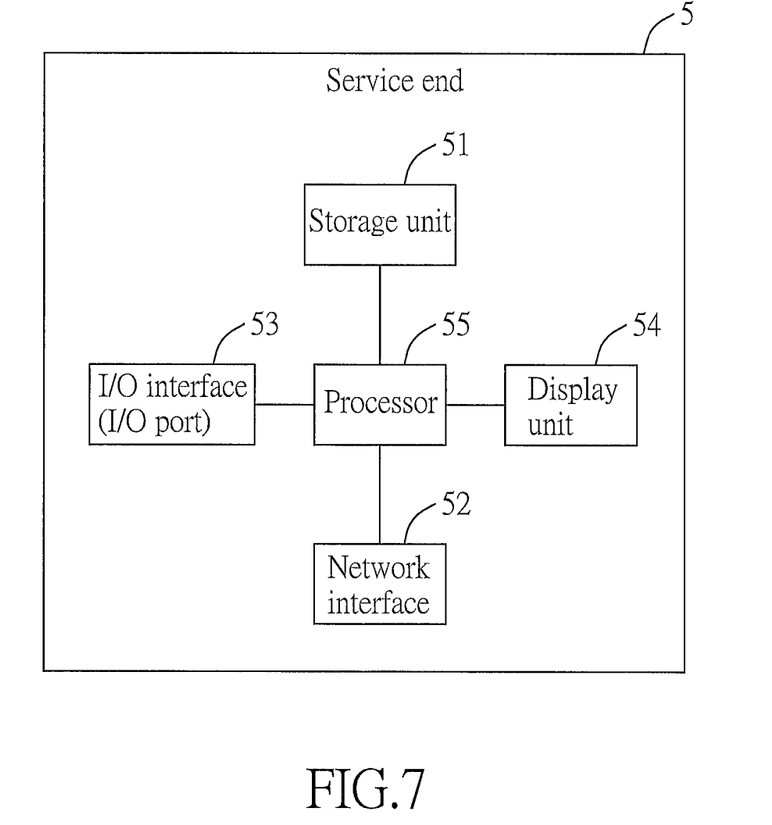
Figure 8:
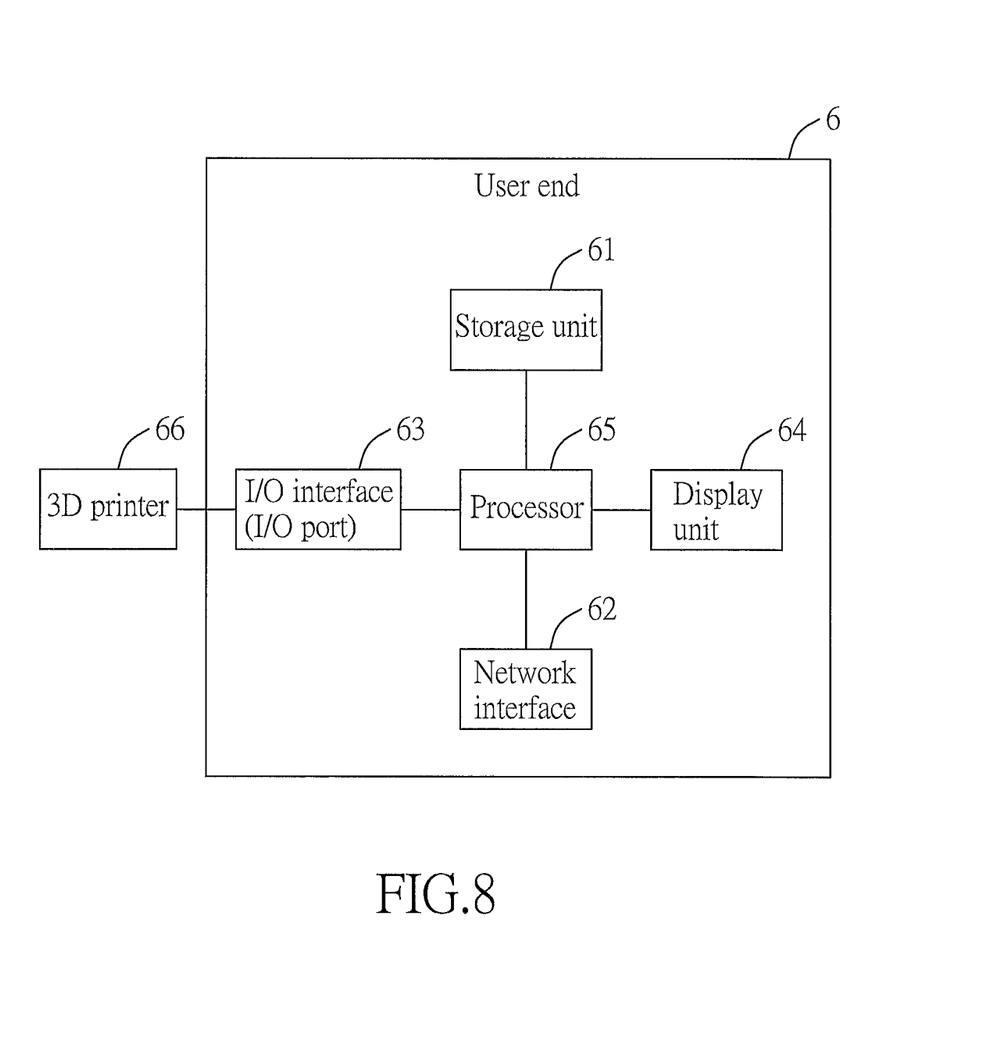

Referring to FIGS. 6 to 8, each of the creator end 4, the service end 5 and the user end 6 includes a storage unit 41, 51, 61 storing the programming codes, a network interface 42, 52, 62 coupled to the Internet for communication with the server end 1 (see FIG. 5), an I/O interface 43, 53, 63, a display unit 44, 54, 64, and a processor 45, 55, 65 coupled to the aforementioned components. The I/O interface 43, 53, 63 may include input devices, such as a keyboard, a mouse, and/or a touch screen, and a data transmission interface, such as a USB port and/or other standard I/O port. In this embodiment, both of the creator end 4 and the service end 5 are a personal computer, and the user end 6 is a portable electronic device, but the present invention should not be limited in this respect, that is, the creator end 4, the service end 5, and the user end 6 are only required to be an electronic device capable of executing the programming codes for implementing the methods of the present invention. The I/O interface 63 of the user end 6 is further coupled to the 3D printer 66.

It should be noted that, the aforementioned step S6 (see FIG. 4) includes steps S61 to S64 that are performed by the processor 65 of the user end 6, and step 65 (see FIG. 3) that is performed by the 3D printer 66.

Referring to FIGS. 4 to 8, the data generating method for 3D printing of this invention is performed after the processors 15, 45, 55, 65 respectively execute the programming codes stored respectively in the storage units 11, 41, 51, 61, and further includes steps P1 to P4, which are described hereinafter.

Step P1: The server end 1 receives and stores the 3D graphic file into the graphic file database 2. In this embodiment, the server end 1 receives the 3D graphic file from the creator end 4. In other embodiments, there may be a plurality of the creator ends 4.

Step P2: The server end 1 transmits the 3D graphic file to the service end 5 for optimization adjustment. As mentioned above, the service end 5 may be operated by a professional operator, or use certain algorithms, such as an artificial neural network, massive computing, etc., to perform computation. In this embodiment, the service end 5 is operated by the professional operator to obtain optimal printing parameters and to generate the printing profile. In detail, the server end 1 sends a notice to the service end 5 upon receipt of the 3D graphic file, and the service end 5 sends a download request to the server end 1 for downloading the 3D graphic file, but the present invention should not be limited in this respect. In other embodiments, the server end 1 may directly transmit the 3D graphic file to the service end 5, or may display a hyperlink of the 3D graphic file on a webpage, so that the service end 5 may download the 3D graphic file through the webpage.

The printing profile includes multiple printing parameters, each of which has an attribute code and an attribute value associated with the attribute code, and represents an attribute setting for 3D printing. For example, one of the attribute codes may be "raft", which represents whether or not a raft should be added, and the corresponding attribute value may be 1 or 0, respectively representing "Yes" or "No". Another one of the attribute codes may be "shells", which represents a shell thickness, and the corresponding attribute value may be 0, 1 or 2, respectively representing "thin", "normal" or "thick". Table 1 lists some exemplary attribute codes for 3D printing, corresponding attribute values, and meanings thereof. After tests and judgments by the operator, optimal printing parameters may be determined and saved to generate the printing profile. It should be noted that some types of the 3D graphic files may be compatible with the same printing profile, so that the operator may use an existing printing profile for testing, and may not need to establish a new printing profile for every 3D graphic file.

TABLE 1

| Attribute Code | Meaning of Code | Attribute Value | Meaning of Value |
|---|---|---|---|
| Raft | Add a raft? | 0, 1 | 0: No<br>1: Yes |
| Support | Print additional | 0, 1 | 0: No |

TABLE 1-continued

| Attribute Code | Meaning of Code | Attribute Value | Meaning of Value |
|---|---|---|---|
| | support? | | 1: Yes |
| Density | Density | 0, 1, 2, 3, 4 | 0: Hollow |
| | | | 1: Low |
| | | | 2: Medium |
| | | | 3: High |
| | | | 4: Solid |
| Resolution | Layer thickness | 0, 1, 2, 3 | 0: 0.1 mm |
| | | | 1: 0.2 mm |
| | | | 2: 0.3 mm |
| | | | 3: 0.4 mm |
| Shells | Shell thickness | 0, 1, 2 | 0: Thin |
| | | | 1: Normal |
| | | | 2: Thick |
| Speed | Speed of Printing | 0, 1, 2 | 0: Slow |
| | | | 1: Standard |
| | | | 2: Fast |

For example, the operator may determine whether a raft should be added according to the bottom structure of the 3D model of the 3D graphic file, determine whether an additional support should be printed according to whether an overhanging portion exists in the 3D model, determine the density and the shell thickness according to a material strength for the 3D model, determine the layer thickness according to sophistication of the 3D model, and determine the speed of printing according to complexity of the 3D model.

In another case, the service end 5 has already stored a plurality of the printing profiles, and the received 3D graphic file may be compatible with one of the printing profiles. In such a case, the operator may use an operation interface (not shown) to select the compatible one of the printing profiles for testing the 3D graphic file.

Regardless of whether the to-be-used printing profile is generated by directly inputting new printing parameters, or is selected from existing printing profiles, the processor 55 of the service end 5 (see FIG. 7) performs slicing to simulate printing condition after reading the 3D graphic file and the printing profile. When the slicing is successful and the G-code is generated, the operator may use a 3D printer (not shown) that is coupled to the service end 5 to print out the 3D object. When the slicing is unsuccessful, the processor 55 may notify the operator to re-select the 3D graphic file and the printing profile. Therefore, during the test period, the operator may need to repeat selecting a printing profile, adjusting printing parameters, and enabling the processor 55 to perform slicing. Test results may be recorded by performing the steps P3 and P4, so that the user end 6 does not need to test or search a suitable printing profile when wishing to print a 3D object according to the 3D graphic file. It should be noted that the service end 5 is not necessarily coupled to a 3D printer. When the printing profile is generated using a computing algorithm, the 3D printer is not required for the service end 5.

Step P3: The server end 1 stores the printing profile into the profile database 3. In a case that the printing profile is newly created by the operator, this step refers to the service end 5 uploading the printing profile to the server end 1 after adjustment of the printing parameters, i.e., the printing profile is newly added into the profile database 3. In another case that the printing profile determined by the operator is an existing printing profile, this step may be omitted. In yet another case that the printing profile is obtained by modifying an existing printing profile, this step refers to saving the modified printing profile as another printing profile, or to overwriting the existing printing profile. In other words, this step is not limited to adding a new printing profile, and may refer to modifying or overwriting an existing printing profile.

Step P4: The service end 5 transmits to the server end 1 identification information of the printing profile that corresponds to the 3D graphic file. After the profile database 3 stores the printing profile, regardless of whether the printing profile is stored in step P3 or previously exists, the identification information may be transmitted. In practice, this step is performed not earlier than step P3, and may be performed after step P3, or simultaneously with step P3.

In this embodiment, the graphic file database 2 contains a correlation table including a plurality of columns that respectively represent an identification code, a filename, and a memory address of the 3D graphic files in the graphic file database 2, and further includes at least a column of "identification information of printing profile" for storing the identification information of the corresponding printing profile. In this step, the server end 1 writes the identification information into the column of "identification information of printing profile".

It should be noted that since the server end 1 has transmitted the 3D graphic file to the service end 5 in step P2, the server end 1 may already record the way to access the 3D graphic file, e.g., the storage path of the 3D graphic file used hereinafter. In a case that the server end 1 does not record the storage path of the 3D graphic file, the service end 5 may transmit to the server end 1 the information of the storage path of the 3D graphic file.

In the case that the server end 1 has recorded the storage path of the 3D graphic file, the server end 1 provides to the service end 5 a user interface with an input frame for selection of printing profiles after the service end 5 is coupled to the server end 1. The input frame may be used to select a file existing in the profile database 3, or to upload a new printing profile. After selecting and confirming the printing profile, the service end 5 transmits to the server end the identification information of the selected printing profile that corresponds to the 3D graphic file.

In the case that the server end 1 does not record the storage path of the 3D graphic file, the server end 1 provides to the service end 5 a user interface with a first input frame for selecting the 3D graphic file, and a second input frame for selecting the printing profile. The first and second input frames may be displayed sequentially or simultaneously. Each of the first and second input frames may be used to select a file existing in the database (i.e., the graphic file database or the profile database), or to upload a new file. After the operator selects and confirms the 3D graphic profile and the printing profile, the service end 5 transmits to the server end 1 the storage path of the 3D graphic file and the identification information of the selected printing profile that corresponds to the 3D graphic file.

When the 3D graphic file is stored into the graphic file database 2 in step P1, since the identification information of the corresponding printing profile has not yet been received by the server end 1, the column of "identification information of printing profile" may be empty. However, the server end 1 may write into the column default information, which may be a generic printing profile. Furthermore, the server end 1 may write a generic printing profile corresponding to a category of the 3D graphic file inputted by the creator end 4 when the 3D graphic file is uploaded.

Figure 9:
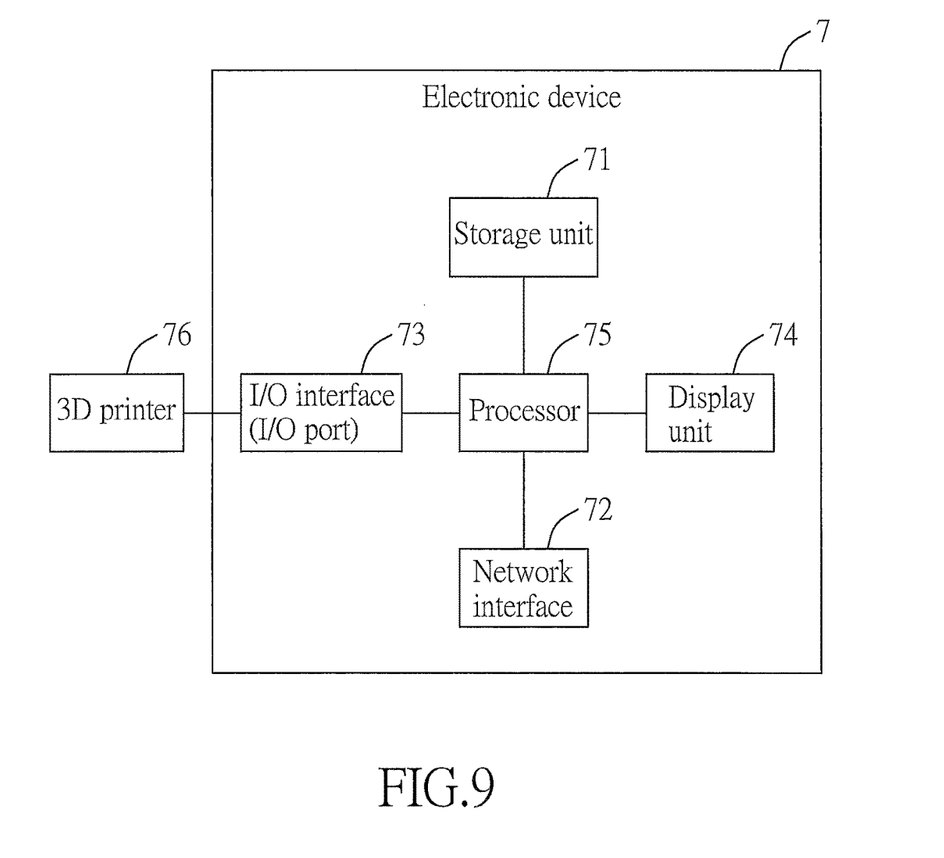
FIG. 9 is a block diagram of an electronic device in a second preferred embodiment of the data generating method for 3D printing and the method for printing a 3D object according to the present invention.
Figure 10:
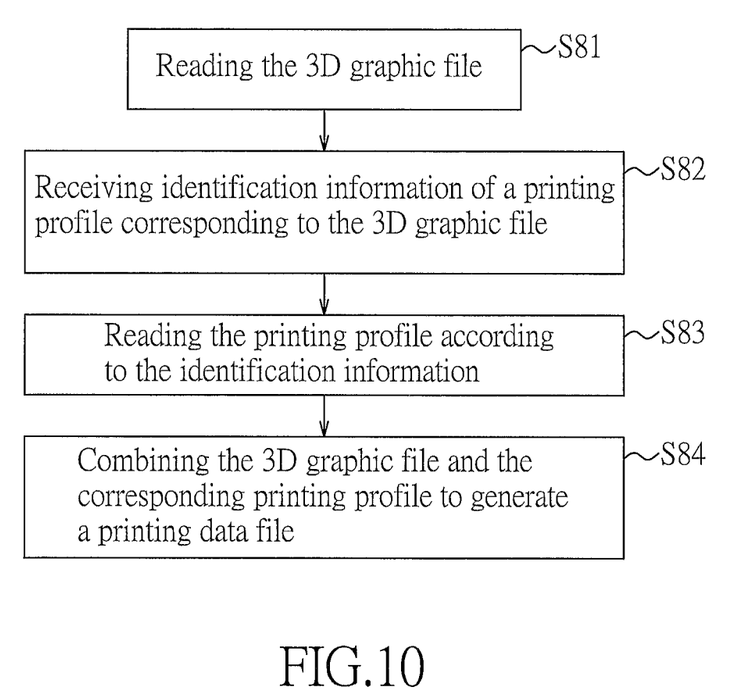
FIG. 10 is a flow chart illustrating steps of the data generating method for 3D printing of the second preferred embodiment.

FIGS. 9 and 10 illustrate that the computer system that implements the second preferred embodiment of the data generating method for 3D printing according to the present invention is an electronic device 7. The electronic device 7 includes a storage unit 71 storing programming codes, a network interface 72 coupled to the Internet, an I/O interface 73, a display unit 74 and a processor 75 coupled to the aforesaid components 71, 72, 73 and 74. The programming codes stored in the storage unit 71 configure the processor 75 to implement the methods of the present invention when executed. The I/O interface 73 may include input devices, such as a keyboard, a mouse, and/or a touch screen, and a data transmission interface, such as a USB port and/or other standard I/O port. The electronic device 7 is further coupled to a 3D printer 76 via the I/O interface 73, and performs the steps S81 to S84 described hereinafter.

Step S81: The electronic device 7 reads the 3D graphic file, which may be received via the network interface 72 or the I/O interface 73, or stored in the storage unit 71.

Then, a user of the electronic device 7 may perform tests for the 3D graphic file as the operator in the first preferred embodiment, and the details of tests are not repeated herein for the sake of brevity.

Step S82: The electronic device 7 receives identification information of a printing profile corresponding to the 3D graphic file. As an example, the identification information of the printing profile is inputted via the I/O interface 73. Then, the electronic device 7 records a correspondence between the 3D graphic file and the identification of the printing profile, where the printing profile is associated with various settings for 3D printing, and includes a plurality of printing parameters, each of which includes an attribute code and an attribute value.

The identification information may be a filename of the printing profile, or, in a case that the printing profile is stored in a database of the electronic device 7, may be an identification code (e.g., a serial number) of the printing profile in the database, for the electronic device 7 to record the correspondence between the 3D graphic file and the identification information of the printing profile.

Since the 3D graphic file has been read in step S81, the electronic device 7 may already record the way to access the 3D graphic file, e.g., the storage path of the 3D graphic file used hereinafter. In a case that the electronic device 7 does not record the storage path of the 3D graphic file, the storage path of the 3D graphic file is recorded in this step.

In the case that the electronic device 7 has recorded the storage path of the 3D graphic file, the electronic device 7 provides a user interface with an input frame for selection of printing profiles. The input frame may be used to select a file existing in the electronic device 7, or to read a new printing profile via the network interface 72. After selecting and confirming the printing profile, the processor 75 receives the identification information of the selected printing profile that corresponds to the 3D graphic file.

In the case that the electronic device 7 does not record the storage path of the 3D graphic file, the electronic device 7 provides a user interface with a first input frame for selecting the 3D graphic file, and a second input frame for selecting the printing profile. The first and second input frames may be displayed sequentially or simultaneously. Each of the first and second input frames may be used to select a file existing in the electronic device 7, or to read a new file via the network interface 72. After selecting and confirming the 3D graphic file and the printing profile, the electronic device 7 receives the storage path of the 3D graphic file and the identification information of the selected printing profile that corresponds to the 3D graphic file via the I/O interface 73.

Step S83: The electronic device 7 reads the printing profile according to the identification information.

Step S84: The electronic device combines the 3D graphic file and the corresponding printing profile to generate a printing data file. After completion of this step, 3D printing may be performed regardless of whether or not the person performing the 3D printing is knowledgeable on how to set the printing parameters.

Then, the electronic device 7 performs the method for printing a 3D object according to the present invention. That is, the electronic device 7 plays roles of the server end 1 and the user end 6 of the first preferred embodiment to perform 3D printing.

To sum up, by recording the correspondence between the printing profile and the 3D graphic file, and combining the 3D graphic file and the corresponding printing profile to generate the printing data file, end users are not required to set additional parameters, and may easily perform slicing and 3D printing.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A data generating method for three-dimensional (3D) printing, said data generating method to be implemented by a computing system, and comprising the steps of:
   (A) receiving, by the computing system, a 3D graphic file and a plurality of printing profiles for printing a 3D object, wherein each of the printing profiles is associated with 3D printing for the 3D graphic file and is respectively corresponds to configured for a different printing quality in printing the 3D object, and wherein each of the plurality of printing profiles is received from a service device of a service end, each of the printing profiles comprising a plurality of printing parameters associated with printing operation of a 3D printing device and associated with slicing of the 3D graphic file;
   (B) recording, by the computing system, a correspondence between the 3D graphic file and each of the printing profiles that are received in step (A);
   (C) combining, by the computing system, the 3D graphic file and one of the printing profiles according to:
      (i) the correspondence therebetween recorded in step (B) and
      (ii) a user command that is received from a user device of a user end to select, from among the plurality of printing profiles, the one printing profile to generate a printing data file, the user end being different from the service end, wherein the printing data file is optimized and eliminates mismatch between the 3D graphic file and one of the printing profiles;
   (D) in response to receiving the printing data file at the user device, performing slicing operation to simulate printing condition based on the printing data file;
   (E) determining whether the slicing operation is successful;
   (F) in response to the slicing operation being successful, transmitting, by the user device, a command for enabling the 3D printing device to form the 3D object based on the printing data file, otherwise; and
   (G) requesting an operator to re-select the 3D graphic file and one of the printing profiles.

2. The data generating method as claimed in claim 1, wherein each of the printing parameters has an attribute code and an attribute value associated with the attribute code.

3. The data generating method as claimed in claim 1, further comprising, prior to step (C), the step of:
(H) receiving, by the computing system, the user command from the user device, the user command including a request for acquiring the printing data file;
wherein step (C) further includes transmitting the printing data file to the user device according to the user command received in step (H).

4. The data generating method as claimed in claim 2, wherein the attribute codes comprise raft, support, density, resolution, shells, and speed.

5. The data generating method as claimed in claim 1, further comprising, prior to step (B), the step of:
(H) receiving, by the computing system, identification information of each of the printing profiles; wherein, in step (B), the computing system records the correspondence according to the identification information received in step (H) for each of the printing profiles.

6. The data generating method as claimed in claim 5, wherein, for each of the printing profiles, the identification information is a filename, a storage path of the printing profile, or an identification code of the printing profile.

7. The data generating method as claimed in claim 6, wherein, for each of the printing profiles, the identification information is the identification code, the identification code being a serial number of the printing profile.

8. The data generating method as claimed in claim 1, wherein the computing system is a server device and receives the 3D graphic file via an Internet.

9. The data generating method as claimed in claim 8, wherein, in step (A), the computing system receives the 3D graphic file via the Internet from a creator device of a creator end, which is different from the service end.

10. The data generating method as claimed in claim 1, wherein the different printing qualities comprise high, medium, and low qualities.

11. A method for printing a three-dimensional (3D) object, said method to be implemented by a user device of a user end, the user device being coupled to a 3D printing device, and comprising:
(A) transmitting, by the user device to a computer system that stores a plurality of printing profiles, a user command to select, from among the plurality of printing profiles, one of the printing profiles for generation of a printing data file, wherein the printing data file comprises a 3D graphic file portion and a printing profile portion, wherein the printing profile portion relates to said one printing profile and is associated with 3D printing of the 3D graphic file portion, wherein each of the printing profiles originates from a service device of a service end and is respectively corresponds to configured for a different printing quality in printing a 3D object, wherein the service end is different from the user end, and wherein each of the printing profiles comprises a plurality of printing parameters that are associated with printing operation of the 3D printing device and that are associated with slicing of the 3D graphic file portion, wherein the printing data file is optimized and eliminates mismatch between the 3D graphic file and one of the printing profiles;
(B) loading, by the user device, the printing data file;
(C) slicing, by said the user device, the 3D graphic file portion according to the printing profile portion to generate a slicing result, and generating a control command according to the slicing result;
(D) determining whether the slicing being successful;
(E) in response to the slicing being successful, driving, by the user device, the 3D printing device according to the control command to form the 3D object otherwise; and
(F) requesting an operator to re-select the 3D graphic file and one of the printing profiles.

12. The method as claimed in claim 11, wherein each of the printing parameters has an attribute code and an attribute value associated with the attribute code.

13. The method as claimed in claim 11, wherein, in step (C), the slicing result is a 3D printing programming language code, and the control command is generated according to the 3D printing programming language code.

14. A data processing system for processing three-dimensional (3D) printing data, said data processing system comprising a server device that includes:
a storage unit configured to store a 3D graphic file and a plurality of printing profiles, each of the printing profiles being associated with 3D printing of the 3D graphic file, wherein the storage unit is further configured to record a correspondence between the 3D graphic file and each of the printing profiles, and wherein each of the printing profiles originates from a service device of a service end and contains a plurality of printing parameters that are associated with printing operation of a 3D printing device and that are associated with slicing of the 3D graphic file; and
a processor configured to:
(i) be coupled to a user device of a user end that is different from the service end,
(ii) combine the 3D graphic file and the printing profiles according to the correspondence stored in said storage unit to generate a printing data file, wherein each of the printing profiles is respectively corresponds to configured for a different printing quality in printing the 3D object, and wherein the printing data file is optimized and eliminates mismatch between the 3D graphic file and one of the printing profiles;
(iii) in response to receiving the printing data file at the user device, perform slicing operation to simulate printing condition based on the printing data file;
(iv) determine whether the slicing operation is successful;
(v) in response to the slicing operation being successful, transmit, by the user device, a user command for enabling the 3D printing device to form the 3D object based on the printing data file, otherwise; and
(vi) request an operator to re-select the 3D graphic file and one of the printing profiles.

15. The data processing system as claimed in claim 14, wherein each of the printing parameters has an attribute code and an attribute value associated with the attribute code.

16. The data processing system as claimed in claim 14, further comprising a network interface coupled to said processor and configured to receive the user command from the user device and to send the user command to said processor, the user command including a request for acquiring the printing data file, said processor being configured to transmit via said network interface the printing data file generated thereby to the user device according to the user command.

17. The data processing system as claimed in claim 14, further comprising: a network interface; said user device, wherein said user device is coupled to said processor via said network interface, and wherein said 3D printing device is coupled to said user device, said user device being configured to load the printing data file that combines the 3D graphic file with the one printing profile.

18. The data processing system as claimed in claim 14, further comprising a network interface coupled to said processor, said service device, said user device, and a creator device of a creator end that is different from the service end, wherein said processor is configured to receive, via said network interface, the 3D graphic file from said creator device.

19. The data processing system as claimed in claim 14, further comprising a network interface coupled to said processor and configured to receive identification information of each of the printing profiles from said server device and to send the identification information of each of the printing profiles to said processor, wherein said processor records into said storage unit the correspondence according to the identification information of each of the printing profiles.

20. The data processing system as claimed in claim 14, further comprising an input/output (I/O) interface coupled to said processor, and said 3D printing device coupled to said I/O interface.

* * * * *